(12) United States Patent
Robinson et al.

(10) Patent No.: US 9,423,748 B1
(45) Date of Patent: Aug. 23, 2016

(54) PRODUCING MULTI-PASS OUTPUT FOR DIFFERENT EXTENSION COLORANTS ON COLOR PRESS

(71) Applicant: Xerox Corporation, Norwalk, CT (US)

(72) Inventors: David C. Robinson, Penfield, NY (US); Katherine Loj, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/792,774

(22) Filed: Jul. 7, 2015

(51) Int. Cl.
*G03G 15/00* (2006.01)

(52) U.S. Cl.
CPC ............ *G03G 15/5016* (2013.01); *G03G 15/50* (2013.01); *H04N 2201/00* (2013.01)

(58) Field of Classification Search
CPC ....................................................... G03G 15/50
USPC ............................................ 358/3.28; 399/81
See application file for complete search history.

(56) References Cited

U.S. PATENT DOCUMENTS

| | | | |
|---|---|---|---|
| 4,074,284 A | 2/1978 | Dexter et al. | |
| 5,305,070 A * | 4/1994 | Snelling | G03G 15/0126 347/118 |
| 5,513,920 A | 5/1996 | Whritenor et al. | |
| 5,713,062 A * | 1/1998 | Goodman | G03G 15/104 399/223 |
| 5,899,605 A * | 5/1999 | Caruthers, Jr. | G03G 15/0121 399/223 |
| 6,002,893 A * | 12/1999 | Caruthers, Jr. | G03G 15/0121 399/233 |
| 6,474,800 B1 * | 11/2002 | Baitz | B41J 2/17513 347/86 |
| 6,552,820 B1 * | 4/2003 | Hill | B41M 1/18 358/1.18 |
| 7,004,562 B2 * | 2/2006 | Madeley | B41J 13/226 347/21 |
| 7,032,517 B2 * | 4/2006 | Bestmann | H04N 1/54 101/484 |
| 7,164,498 B2 * | 1/2007 | Van Bael | H04N 1/603 358/1.9 |
| 7,466,448 B2 * | 12/2008 | Yamamoto | H04N 1/54 358/1.9 |
| 7,649,649 B2 * | 1/2010 | Eschbach | G06T 7/408 358/1.9 |
| 7,891,755 B2 | 2/2011 | Mantell | |
| 8,310,717 B2 | 11/2012 | Ochs et al. | |
| 8,520,257 B2 * | 8/2013 | Teraue | H04N 1/6097 345/593 |
| 8,773,715 B2 * | 7/2014 | Katayama | H04N 1/6055 345/594 |
| 9,077,939 B1 * | 7/2015 | Ayash | H04N 1/6066 |
| 2002/0163570 A1 * | 11/2002 | Phillips | G03G 15/01 347/224 |
| 2004/0091286 A1 * | 5/2004 | Lange | G03G 13/013 399/223 |
| 2006/0164465 A1 * | 7/2006 | Steinmetz | B41J 2/17533 347/43 |
| 2007/0048020 A1 * | 3/2007 | Silence | G03G 15/01 399/223 |

(Continued)

*Primary Examiner* — Clayton E Laballe
*Assistant Examiner* — Kevin Butler
(74) *Attorney, Agent, or Firm* — Gibb & Riley, LLC

(57) ABSTRACT

A processor receives a print job, identifies possible extension marking materials to use to print the print job, and optimizes the order in which the extension marking materials will be used in multiple printing passes. A user interface outputs instructions to insert, into a receptacle, a first interchangeable supply container containing a first extension marking material that is in addition to base marking materials. A printing engine prints first markings (using the first extension marking material) that comprise a first portion of the print job. The user interface outputs instructions to return the partially printed print media to a sheet supply and to insert a second interchangeable supply container containing a second extension marking material. The printing engine prints second markings (using the second extension marking material) that comprise a second portion of the print job, on the partially printed print media, to produce the finally printed print media.

16 Claims, 7 Drawing Sheets

(56) References Cited

U.S. PATENT DOCUMENTS

| | | | | |
|---|---|---|---|---|
| 2007/0098430 A1* | 5/2007 | Hoffman | G03G 15/0194 | 399/82 |
| 2009/0324303 A1* | 12/2009 | Crean | G03G 15/0121 | 399/298 |
| 2010/0092215 A1* | 4/2010 | Veregin | G03G 15/0126 | 399/223 |
| 2012/0027482 A1* | 2/2012 | Lawniczak | G03G 15/6594 | 399/381 |
| 2012/0090488 A1* | 4/2012 | Postle | H04N 1/54 | 101/483 |
| 2013/0265593 A1* | 10/2013 | Maltz | H04N 1/6058 | 358/1.9 |
| 2014/0009769 A1* | 1/2014 | Robinson | H04N 1/54 | 358/1.9 |
| 2014/0093267 A1* | 4/2014 | Kubo | G03G 15/0194 | 399/69 |
| 2014/0240790 A1* | 8/2014 | Chapman | H04N 1/00127 | 358/3.28 |

* cited by examiner

PRODUCING MULTI-PASS OUTPUT FOR DIFFERENT EXTENSION COLORANTS ON COLOR PRESS

BACKGROUND

Systems and methods herein generally relate to multi-colorant presses and more particularly, to printing devices that have the ability to use extension colorants.

Various printing systems support the loading of spot colorants (also known as extension colorants) in an extension print housing. The initial print housing generally supports the base colorants (e.g., C, M, Y, K (Cyan, Magenta, Yellow, and Black)). Many printing devices can have an extension housing that can be supplied with a spot colorant, such as silver, gold, or clear colorant.

SUMMARY

The printing devices herein include a processor, a user interface operatively connected to the processor, a printing engine operatively connected to the processor, a sheet supply that supplies print media to the printing engine, permanent supply containers operatively connected to the processor, and a receptacle operatively connected to the processor. The permanent supply containers maintain base marking materials used by the printing engine to print on the print media. The receptacle has a shape to connect to interchangeable supply containers that maintain extension marking materials used by the printing engine to print. The extension marking materials are different colors from the base marking materials.

In one example herein, the processor receives a print job, and the processor identifies at least two possible extension marking materials to use to print the print job. The user interface can output a list of the extension marking materials that may be selected for use with the print job to allow the user to decide which extension marking materials will be used. The processor identifies the order in which the extension marking materials will be used (e.g., which of the extension marking materials to use to print first markings in a first printing pass, and which of the extension marking materials to use to print second markings in a second printing pass). More specifically, the processor optimizes the order of use for the extension marking materials for the print job and then the processor performs a raster image process to generate the first markings and the second markings for the different passes.

The user interface then outputs instructions to insert, into the receptacle, a first interchangeable supply container that maintains a first extension marking material of the extension marking materials. The printing engine prints the first markings, which comprise a first portion of the print job, on the print media to produce partially printed print media. The first markings include markings made using the first extension marking material.

The user interface then outputs instructions to return the partially printed print media to the sheet supply; and to insert, into the receptacle, a second interchangeable supply container that maintains a second extension marking material of the extension marking materials. The first extension marking material is a different color from the second extension marking material. The processor determines whether the second interchangeable supply container is inserted into the receptacle before it instructs the printing engine to print the second markings. The sheet supply supplies the partially printed print media to the printing engine and the printing engine prints the second markings, which comprise a second portion of the print job, on the partially printed print media to produce the finally printed print media. The second markings include markings made using the second extension marking material.

Exemplary methods herein receive, into a processor of a printing device, a print job and identify the extension marking materials to use to print the print job. Using the processor, the methods identify which of the extension marking materials to use to print first markings and which of the extension marking materials to use to print second markings. These methods can output (e.g., on the user interface) a list of the extension marking materials that may be selected for use with the print job to allow the user to decide which extension marking materials will be used. More specifically, the methods herein optimize the order of use for the extension marking materials for the print job and then the methods perform a raster image processing to generate the first markings and the second markings for the different passes.

Using the processor, the methods then output instructions on a user interface of the printing device to insert into the receptacle of the printing device, a first interchangeable supply container. This supply container maintains a first extension marking material of the extension marking materials.

Furthermore, these methods print the first markings including a first portion of the print job, on print media supplied from a sheet supply of the printing device to produce partially printed print media using the printing engine. The printing device includes permanent supply containers that maintain base marking materials used by the printing engine to print, and the extension marking materials are different colors from the base marking materials. The first markings include markings made using the first extension marking material.

Following this, these methods output instructions (e.g., on the user interface) to return the partially printed print media to the sheet supply and to insert into the receptacle, a second interchangeable supply container that maintains a second extension marking material of the extension marking materials. Furthermore, the methods determine whether the second interchangeable supply container is inserted into the receptacle before instructing the printing engine to print the second markings. The methods then supply the partially printed print media from the sheet supply to the printing engine and print second markings, which comprises a second portion of the print job, on the partially printed print media using the printing engine to produce finally printed print media. The second markings include markings made using the second extension marking material.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

Figure 1:
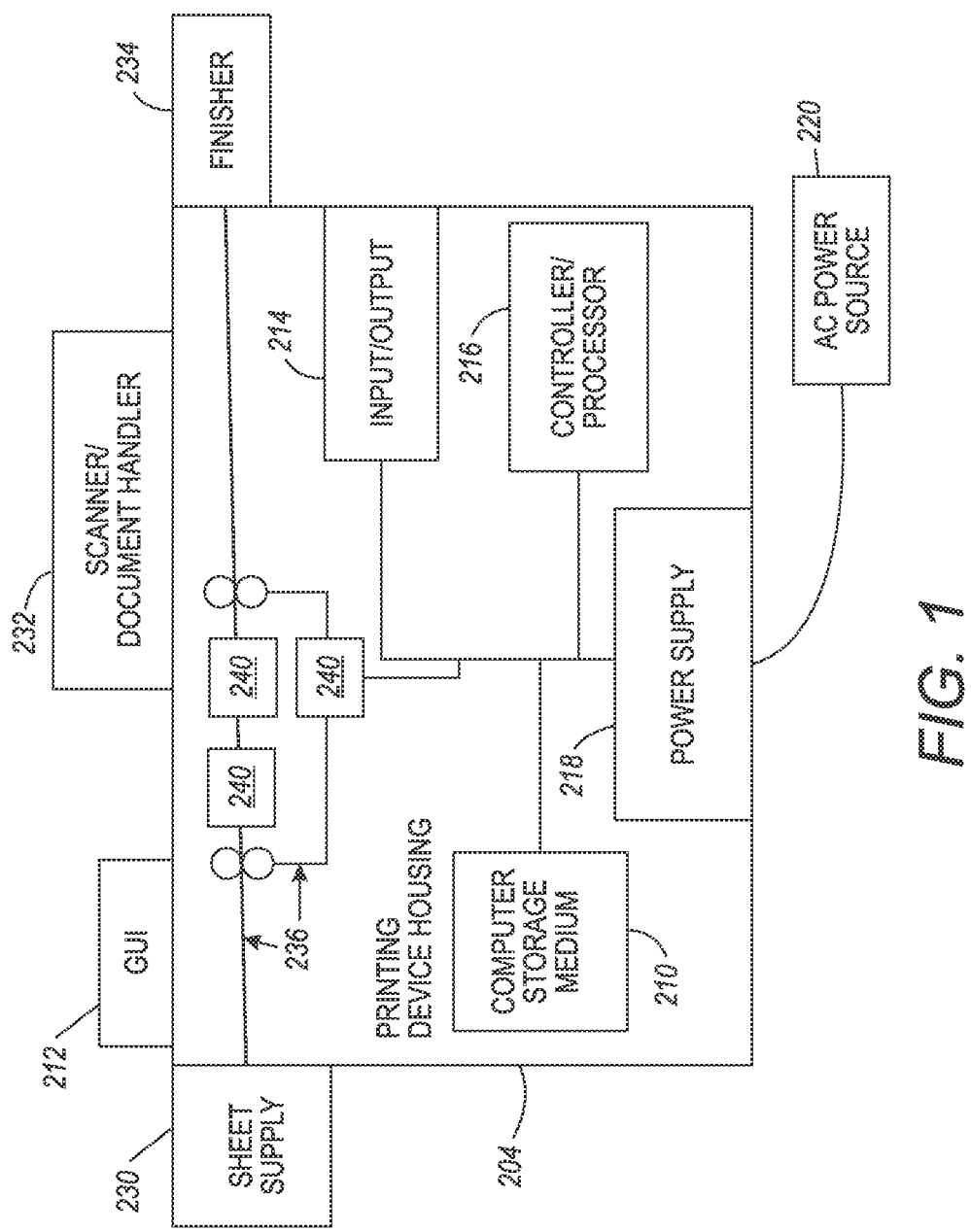
FIG. 1 is a schematic diagram illustrating devices herein.

As mentioned above, many printing devices can have an extension housing that can be supplied with a spot colorant (such as silver, gold, or clear colorant) that is used in addition to the base colorants (e.g., C,M,Y,K (Cyan, Magenta, Yellow and Black)). The methods herein allow the production of printed output containing all possible spot (extension) colorants (as manually or automatically selected) using a multi-pass printing process.

In one exemplary implementation, the methods can provide a menu selection on the graphic user interface of the printer (or terminal) to enable multi-pass capability for spot colorants. This menu selection includes a listing of potential spot colorants, from which the user can select (including the option of "select all"). Print jobs are raster image processed (RIPed) to color planes corresponding to the user menu selections of which spot colorants to use. The devices and methods herein compare the spot colorant image planes individually to the CMYK images planes. The spot colorant with largest pixel overlaps or pixel adjacency are printed in the first print pass and then the second most overlapping or adjacent pixels are printed in the second printing pass, etc. The printing passes are produced on the printer by the digital front end (DFE) supplying the appropriate image planes for each pass.

The menu provides the user options to select the order of the application of the spot colorants and, if not selected by the user, the methods will determine the optimal order of application. The user selections from the menu options result in job attributes being set. These attributes are used by the decomposer to determine the number (and colorant name) of additional colorant planes (beyond CMYK) to be raster image processed.

More specifically, during raster image processing the printer description language (PDL) is analyzed for device N and separation calls that correspond to the colorant names attributes. When an object containing the colorant name is discovered, the object is raster image processed to the appropriate additional plane. After raster image processing to the multiple planes (assuming the user did not specify plane print order) the content of the additional planes is compared to the content of the C, M, Y, and K planes. The number of overlapping and abutting non-zero pixels is counted between the each additional colorants' plane content and the CMYK planes' content. The additional plane with the highest number is printed with first print pass including the CMYK colorant. The next additional colorant with highest content overlap number is printed in the second print pass, etc.

The raster image processor then informs the marker which of the image planes is valid for the first printing pass (e.g., CMYK and silver (not gold)). The marker determines if the additional colorant (silver) is loaded. If not, the user is directed to load the silver colorant. The first pass is printed. The user is directed to load the printed media back into the feed trays, and is directed to load the appropriate colorants (e.g., gold) for the second print pass. On the second print pass, the raster image processor provides only the appropriate additional image plane and colorant name to the marker, and then the second pass is printed.

Therefore, the systems and methods herein provide the use of a multi-colorant capable system to print two or more spot colorants with the standard CMYK colorants. Furthermore, these systems and methods help the user adjust the specification of colorant handling through the user interface controls, and help the determination of close proximity colorants. These systems and methods also include an optimization method for determining the order of colorants to be printed.

The systems and methods discussed above could be used for 6 or more color housings in printing devices and include a pre-flight procedure used to determine the spot colorants within the printer description language, which drives the user interface colorant selection for multi-pass printing. Regions of overlap between base colorant and extension colorants that will not be printed in the first print pass can also be trapped to cover up misregistration problems.

The plane overlap analysis is used by the systems and methods herein, for weighting factors for the planes that overlap (e.g., a cyan/silver overlap can be weighted as more critical than a gold/yellow overlap by systems and methods herein). The plane overlap analysis uses weighting factors for the region of plane overlap (e.g., an overall in the center of a page can be weighted as being more critical than an outer page region overlap by systems and methods herein). The GUI colorant selection includes, in some variants, the number of passes (which can be more than 2 print passes) for the additional colorants. For example, the first print pass can be driven by the currently loaded extension colorant and overlap analysis is done for other additional colorants. The pass ordering is also, in some systems and methods herein, determined by ink limit considerations. For example, if one spot colorant had call for 100% and another had a maximum call of 30%, the 30% spot colorant would be printed on the first pass.

Referring now to the drawings, FIG. 1 illustrates a printing device 204, which can be used with systems and methods herein and can comprise, for example, a printer, copier, multi-function machine, multi-function device (MFD), etc. The printing device 204 includes a special-purpose controller/tangible processor 216 that includes specialized circuits that are unique to print processing, and a communications port (input/output) 214 operatively connected to the tangible processor 216 and to the computerized network 202 external to the printing device 204. Also, the printing device 204 can include at least one accessory functional component, such as a graphic user interface (GUI) assembly 212 that also operate on the power supplied from the external power source 220 (through the power supply 218). The user may receive messages, instructions, and menu options from, and enter instructions through, the graphical user interface or control panel 212.

The input/output device 214 is used for communications to and from the printing device 204 and comprises a wired device or wireless device (of any form, whether currently known or developed in the future). The tangible processor 216 controls the various actions of the printing device 204. A non-transitory, tangible, computer storage medium device 210 (which can be optical, magnetic, capacitor based, etc., and is different from a transitory signal) is readable by the tangible processor 216 and stores instructions that the tangible processor 216 executes to allow the computerized device to perform its various functions, such as those described herein. Thus, as shown in FIG. 1, a body housing has one or more functional components that operate on power supplied from an alternating current (AC) source 220 by the power supply 218. The power supply 218 can comprise a common power conversion unit, power storage element (e.g., a battery, etc), etc.

The printing device 204 includes at least one marking device (printing engine(s)) 240 operatively connected to the tangible processor 216, a media path 236 positioned to supply continuous media or sheets of media from a sheet supply 230 to the marking device(s) 240, etc. After receiving various markings from the printing engine(s) 240, the sheets of media can optionally pass to a finisher 234 which can fold, staple, sort, etc., the various printed sheets. Also, the printing device 204 can include at least one accessory functional component (such as a scanner/document handler 232 (automatic document feeder (ADF)), etc.) that also operate on the power supplied from the external power source 220 (through the power supply 218).

Figure 2:
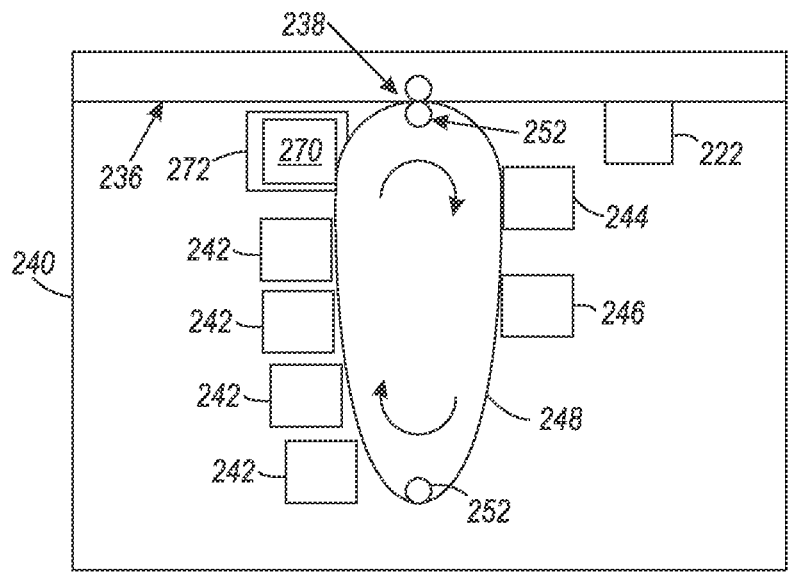
FIG. 2 is a schematic diagram illustrating devices herein.
Figure 3:
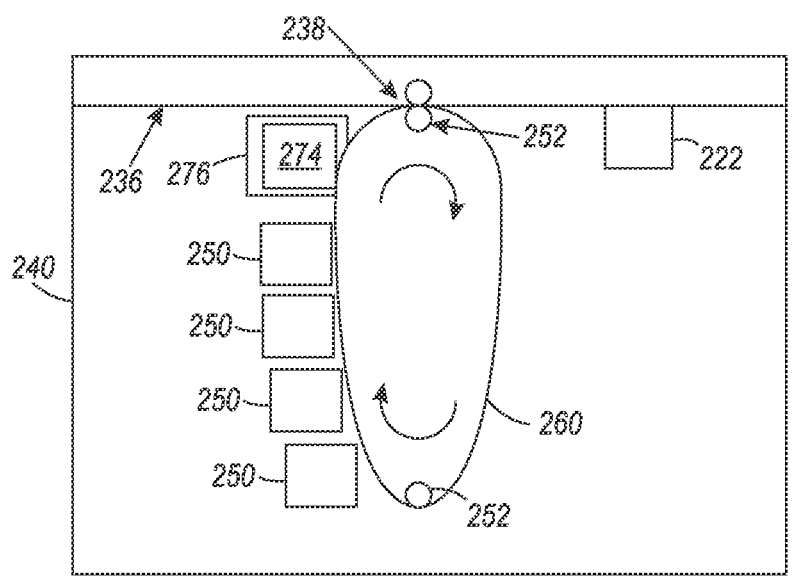
FIG. 3 is a schematic diagram illustrating devices herein.
Figure 4:
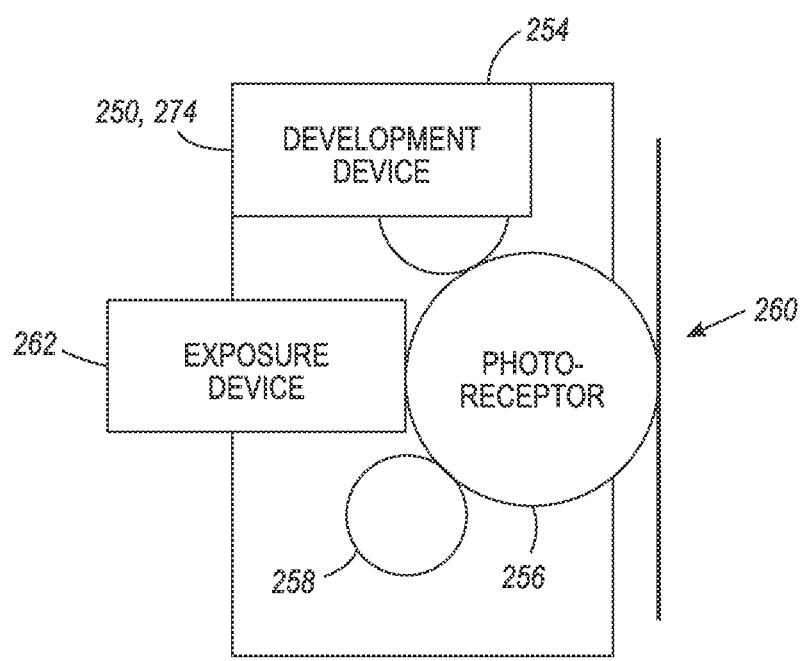
FIG. 4 is a schematic diagram illustrating devices herein.

The one or more printing engines 240 are intended to illustrate any marking device that applies a marking material (toner, inks, etc.) to continuous media or sheets of media, whether currently known or developed in the future and can include, for example, devices that use a photoreceptor belt 248 (as shown in FIG. 2) or an intermediate transfer belt 260 (as shown in FIG. 3), or devices that print directly to print media (e.g., inkjet printers, ribbon-based contact printers, etc.).

More specifically, FIG. 2 illustrates one example of the above-mentioned printing engine(s) 240 that uses one or more (potentially different color) development stations 242 adjacent a photoreceptor belt 248 supported on rollers 252. Thus, in FIG. 2 an electronic or optical image or an image of an original document or set of documents to be reproduced may be projected or scanned onto a charged surface of the photoreceptor belt 248 using an imaging device (sometimes called a raster output scanner (ROS)) 246 to form an electrostatic latent image. Thus, the electrostatic image can be formed onto the photoreceptor belt 248 using a blanket charging station/device 244 (and item 244 can include a cleaning station or a separate cleaning station can be used) and the imaging station/device 246 (such as an optical projection device, e.g., raster output scanner). Thus, the imaging station/device 246 changes a uniform charge created on the photoreceptor belt 248 by the blanket charging station/device 244 to a patterned charge through light exposure, for example.

The photoreceptor belt 248 is driven (using, for example, driven rollers 252) to move the photoreceptor in the direction indicated by the arrows past the development stations 242, and a transfer station 238. Note that devices herein can include a single development station 242, or can include multiple development stations 242, each of which provides marking material (e.g., charged toner) that is attracted by the patterned charge on the photoreceptor belt 248. The same location on the photoreceptor belt 248 is rotated past the imaging station 246 multiple times to allow different charge patterns to be presented to different development stations 242, and thereby successively apply different patterns of different colors to the same location on the photoreceptor belt 248 to form a multi-color image of marking material (e.g., toner) which is then transferred to print media at the transfer station 238.

As is understood by those ordinarily skilled in the art, the transfer station 238 generally includes rollers and other transfer devices. Further, item 222 represents a fuser device that is generally known by those ordinarily skilled in the art to include heating devices and/or rollers that fuse or dry the marking material to permanently bond the marking material to the print media.

Thus, in the example shown in FIG. 2, which contains four different base color development stations 242 and an extension development station 270, the photoreceptor belt 248 is rotated through multiple revolutions in order to allow each of the development stations 242, 270 to transfer a different color marking material (where each of the development stations 242, 270 transfers marking material to the photoreceptor belt 248 during a different revolution). After all such revolutions, different colors have been transferred to the same location of the photoreceptor belt, thereby forming a complete multi-color image on the photoreceptor belt, after which the complete multi-color image is transferred to print media, traveling along the media path 236, at the transfer station 238.

The base color development stations 242 are (or can include) permanent supply containers that are operatively connected to the processor 216. In addition, the extension development station 270 is (or can include) an interchangeable supply container that connects to at least one receptacle 272. In other words, the extension development station 270 can include an integral interchangeable supply container (or housing unit) or the interchangeable supply container can be a separate element from the remainder of the extension development station 270, and for convenience, the interchangeable supply container and extension development station are referred to as the same item herein (item 270). The extension development station 270 is similarly operatively connected to the processor. The permanent supply containers 242 maintain base marking materials used by the printing engine to print. While the permanent supply containers 242 can be replaced or refilled as their contents are consumed, the permanent supply containers 242 (and the same color base marking materials) are always present within the printing apparatus 204 whenever any printing operation is performed.

The receptacle 272 is shaped to connect to the interchangeable supply containers 270 that maintain extension marking materials used by the printing engine 240 to print. The extension marking materials are different colors than the colors of the base marking materials. The extension marking materials are for printing operations that utilizes color gamuts that are different than those color gamuts available with the base marking materials alone. For example, the base marking materials can consist of cyan, magenta, yellow, and black (CMYK); or any other base marking material set; while the extension marking materials can be colors other than CMYK (such as orange, green, violet, etc.).

In contrast to the permanent supply containers 242 that always make the base marking materials available to the printing engine 240 for all printing operations, the interchangeable supply containers 270 may or may not be used, and different interchangeable supply containers 270 will be used to provide different color gamuts that are not provided by the base marking materials alone. For example, during base color gamut printing operations, an interchangeable supply container 270 does not actually need to be connected to the receptacle 272, and printing operations can continue simply through the availability of the base marking materials provided by the permanent supply containers 242 (with no interchangeable supply container 270 being used, or even being present). Therefore, the interchangeable supply containers 270 allow the printing device 204 to utilize color gamuts that are not available with the base marking materials alone.

Alternatively, printing engine(s) 240 shown in FIG. 1 can utilize one or more potentially different color marking stations 250, 274 and an intermediate transfer belt (ITB) 260 supported on rollers 252, as shown in FIG. 3. The marking stations 250, 274 can be any form of marking station, whether currently known or developed in the future, such as individual electrostatic marking stations, individual inkjet stations, individual dry ink stations, etc. Each of the marking stations 250, 274 transfers a pattern of marking material to the same location of the intermediate transfer belt 260 in sequence during a single belt rotation (potentially independently of a condition of the intermediate transfer belt 260) thereby, reducing the number of passes the intermediate transfer belt 260 must make before a full and complete image is transferred to the intermediate transfer belt 260.

One exemplary individual electrostatic marking station (which can represent items 250 or 274) is shown in FIG. 1-4 positioned adjacent to (or potentially in contact with) intermediate transfer belt 260. Each of the individual electrostatic marking stations 250, 274 includes its own charging station 258 that creates a uniform charge on an internal photoreceptor 256, an internal exposure device 262 that patterns the uniform charge, and an internal development device 254 that transfers marking material to the photoreceptor 256. The pattern of marking material is then transferred from the photoreceptor 256 to the intermediate transfer belt 260 and eventually from the intermediate transfer belt to the marking material at the transfer station 238.

Thus, the printing devices 204 herein include a processor 216, a user interface 212 operatively connected to the processor 216, a printing engine 240 operatively connected to the processor 216, a sheet supply 230 that supplies print media to the printing engine 240, permanent supply containers 242, 250 operatively connected to the processor 216, and a receptacle 272, 276 operatively connected to the processor 216. As noted above, the permanent supply containers 242, 250 maintain base marking materials used by the printing engine 240 to print on the print media. The receptacle 272, 276 has a shape to connect to interchangeable supply containers 270, 274 that maintain extension marking materials used by the printing engine 240 to print. The extension marking materials are different colors from the base marking materials.

In one example herein, the processor 216 receives a print job, and the processor 216 identifies at least two possible extension marking materials to use to print the print job. The processor 216 can automatically detect that the print job calls for more than 5 colorants, or the processor can automatically evaluate the print job and determined that more than 5 colorants would substantially enhance quality of print job. In either case, once the processor 216 determines that a print job could or should use more than 5 colorants, the processor 216 causes the graphic user interface 212 to display a menu item related to the use of two or more spot colorants.

The user interface 212 can maintain a permanent menu choice for the use of two or more spot colorants, or such a menu may only be presented when the processor 216 identifies that two or more spot colorants are needed or would be useful. Further, with such a menu the user interface 212 can output a list of the extension marking materials that may be selected for use with the print job to allow the user to decide which extension marking materials will be used.

The user can identify the order in which the extension marking materials will be used (e.g., which of the extension marking materials to use to print first markings in a first printing pass, and which of the extension marking materials to use to print second markings in a second printing pass) or the processor 216 can automatically determine their order. For example, the user may have a specific reason for maintaining a specific order of spot colorants, or it may be more convenient for the user to start with a spot color and that is currently mounted within the receptacle 272, 276; and the user interface 212 provides the user an option to choose the order of use of extension marking materials. Alternatively, the processor 216 can optimize the order of use for the extension marking materials for the print job, based on many different criteria; and can make recommendations for the order of use for the extension marking materials on the user interface 212, that the user can accept or reject.

One of the optimization criteria applied by the processor 216 is to prevent or reduce misregistration of colors. The printing process changes the moisture content of the print media and can, therefore, make physical changes (size, texture, etc.) to the sheets of media, decreasing the likelihood of correct registration during subsequent printing passes. Therefore, an extension colorant and that is closely aligned with a base colorant is optimally printed in the same printing pass with that base colorant by systems and methods herein to increase the alignment (registration) between the extension colorant at the base colorant. Thus, in one example, the systems and methods herein determine which extension colorant is most closely aligned with the largest amount of base colorants, and include that extension colorant with the printing pass that prints the base colorants.

Note that it may be useful to print all base colorants in the same print pass (e.g., the first pass) in order to promote proper registration between all base colorants; however, in some situations different base colorants can be printed in different passes. For example, if two base colorants are not adjacent to one another, but are adjacent to different extension colorants, the different printing passes can print base colorant and extension colorant pairs that are closely spaced, and other printing passes can print other base colorant and extension colorant pairs that are closely spaced. The optimization process performed by the processor 216 therefore determines the best passes to print all colorants (base and extension color) based upon the proximity of different colorants to one another, to promote the best registration so that closely spaced colors are printed in the same printing pass.

Additionally, the optimization process can look to ink limit considerations. For example, if a large amount of a base color is called for in a certain portion of the page by the print job, the extension colorant that utilizes the least amount of ink in that portion of the page can be included with that base color, while a different extension colorant that uses a larger quantity of ink can be printed in a separate printing pass from the heavily used base colorant (for that portion of the page). Again, as mentioned above, the extension colorant order optimization process performed by systems and methods herein can print the base colorants in different printing passes in order to optimize ink limit considerations.

Further, as noted above, the optimization processes can weight registration and ink limit considerations based on weighting factors for different pairs of colors, or based on different regions of the page, where some areas of the page are considered more critical than others (center of the page vs. page edges).

Once determining which colorants will be used in the different printing passes, the processor 216 performs a raster image process to generate the first markings and the second markings for the different passes. The user interface 212 then outputs instructions to insert, into the receptacle 272, 276, a first one of the interchangeable supply containers 270, 274 that maintains a first extension marking material of the extension marking materials. The printing engine 240 prints the first markings, which comprise a first portion of the print job, on the print media to produce partially printed print media. The first markings include markings made using the first extension marking material.

The user interface 212 then outputs instructions to return the partially printed print media to the sheet supply 230; and to insert, into the receptacle 272, 276, a second one of the interchangeable supply containers 270, 274 that maintains a second extension marking material of the extension marking materials. The first extension marking material is a different color from the second extension marking material. The processor 216 determines whether the second interchangeable supply container is inserted into the receptacle 272, 276 before it instructs the printing engine 240 to print the second markings. The sheet supply 230 supplies the partially printed print media to the printing engine 240 and the printing engine 240 prints the second markings, which comprise a second portion of the print job, on the partially printed print media, to produce the finally printed print media. The second markings include markings made using the second extension marking material.

Figure 5:
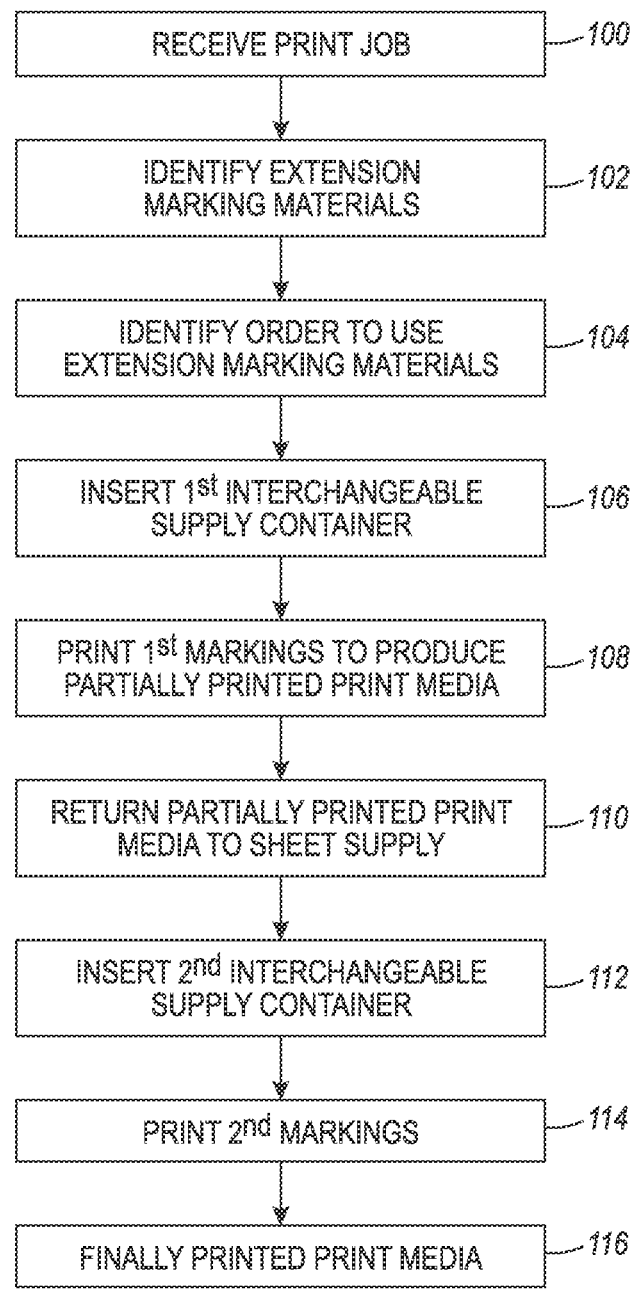
FIG. 5 is a flow diagram of various methods herein.

FIG. 5 is flowchart illustrating exemplary methods herein. In item 100, these methods receive, into a processor of a printing device, a print job. In item 102, these methods automatically or manually (as discussed above) identify the extension marking materials to use to print the print job. Using the processor, the systems and methods automatically or manually (as discussed above) determine the order to use the extension marking materials to identify which of the extension marking materials to use to print first markings and which of the extension marking materials to use to print second marking, as seen in item 104. Using the processor, the systems and methods then automatically output instructions, on a user interface of the printing device, to insert into the receptacle of the printing device the first interchangeable supply container, as shown in item 106. This first interchangeable supply container maintains a first extension marking material of the extension marking materials.

Furthermore these systems and methods, as shown in item 108, automatically print the first markings that include a first portion of the print job on print media supplied from a sheet supply of the printing device to produce partially printed print media using the printing engine. The first markings include markings made using the first extension marking material.

These methods automatically output on the user interface, as seen in item 110, instructions to return the partially printed print media to the sheet supply and to insert into the receptacle, a second interchangeable supply container that maintains a second extension marking material of the extension marking materials, as shown in item 112. The second markings include markings made using the second extension marking material, and the first extension marking material is a different color from the second extension marking material. These methods automatically supply the partially printed print media from the sheet supply to the printing engine and automatically print second markings (as seen in item 114) which make up a second portion of the print job on the partially printed print media using the printing engine to produce finally printed print media, as shown in item 116.

Figure 6:
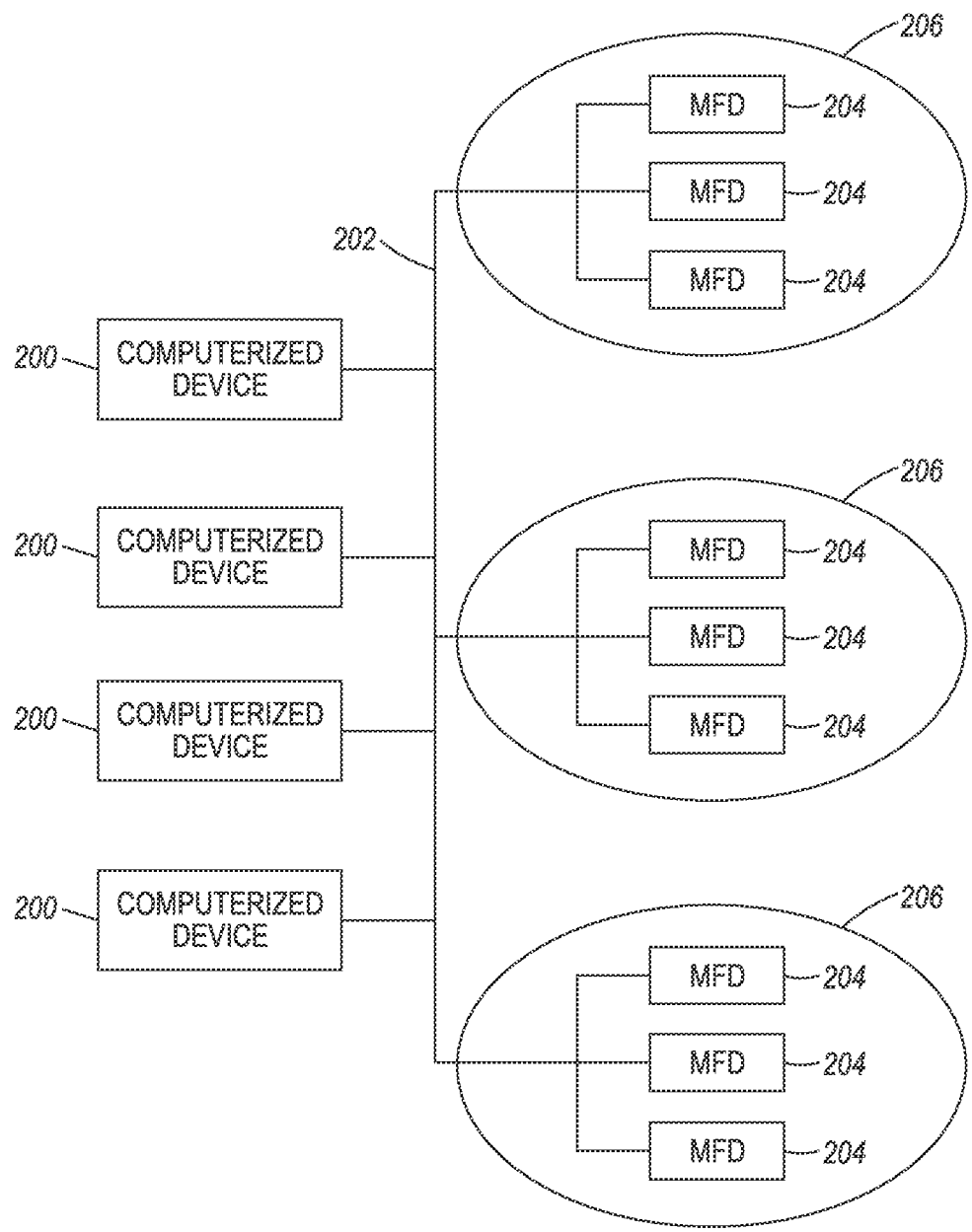
FIG. 6 is a schematic diagram illustrating systems herein.

As shown in FIG. 6, exemplary systems and methods herein include various computerized devices 200, 204 located at various different physical locations 206. The computerized devices 200, 204 can include print servers, printing devices, personal computers, etc., and are in communication (operatively connected to one another) by way of a local or wide area (wired or wireless) network 202. Any of these devices can perform the processing shown in FIG. 7, locally or remotely.

Figure 7:
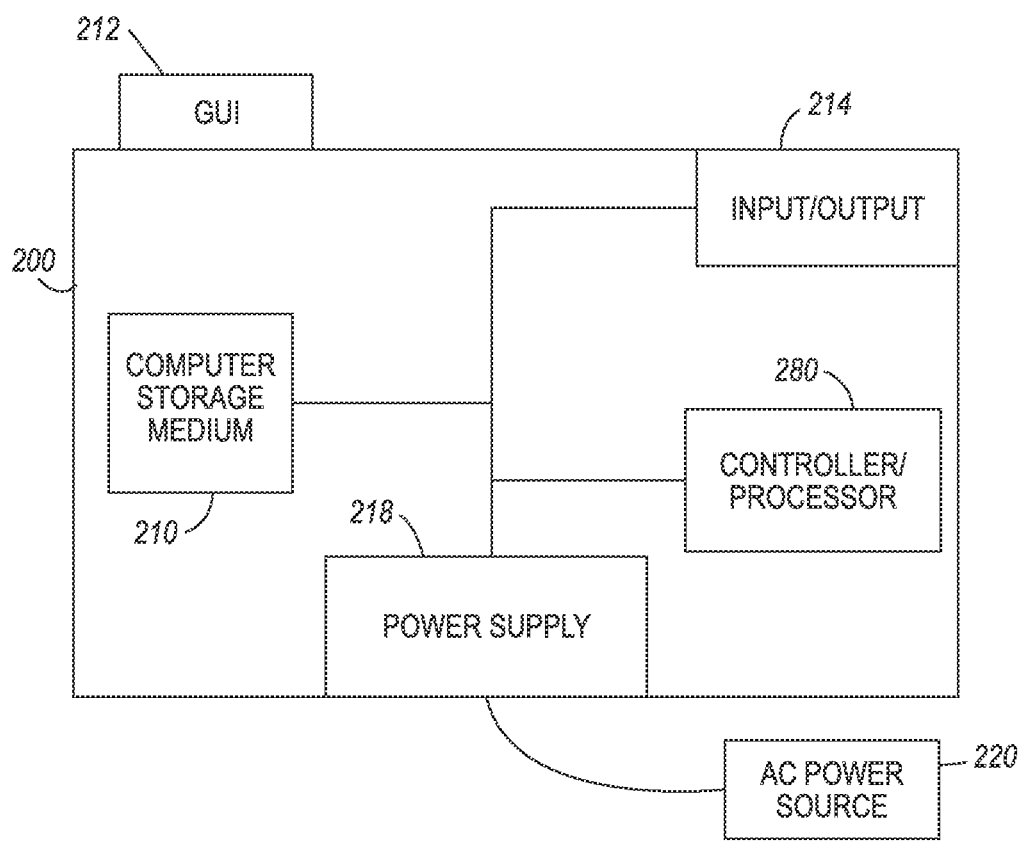
FIG. 7 is a schematic diagram illustrating devices herein.

FIG. 7 illustrates a computerized device 200, which can be used with systems and methods herein and can comprise, for example, a print server, a personal computer, a portable computing device, etc. In a similar manner to the printing device shown in FIG. 1, the computerized device 200 shown in FIG. 7 includes a general-purpose controller/tangible processor 280 and a communications port (input/output) 214 operatively connected to the tangible processor 280 and to the computerized network 202 external to the computerized device 200. Also, the computerized device 200 can include at least one accessory functional component, such as a graphical user interface (GUI) assembly 212 that also operate on the power supplied from the external power source 220 (through the power supply 218). The user may receive messages, instructions, and menu options from, and enter instructions through, the graphical user interface or control panel 212.

The input/output device 214 is used for communications to and from the computerized device 200 and comprises a wired device or wireless device (of any form, whether currently known or developed in the future). The tangible processor 280 controls the various actions of the computerized device. A non-transitory, tangible, computer storage medium device 210 (which can be optical, magnetic, capacitor based, etc., and is different from a transitory signal) is readable by the tangible processor 280 and stores instructions that the tangible processor 280 executes to allow the computerized device to perform its various functions, such as those described herein. Thus, as shown in FIG. 7, a body housing has one or more functional components that operate on power supplied from an alternating current (AC) source 220 by the power supply 218. The power supply 218 can comprise a common power conversion unit, power storage element (e.g., a battery, etc), etc.

Figure 8:
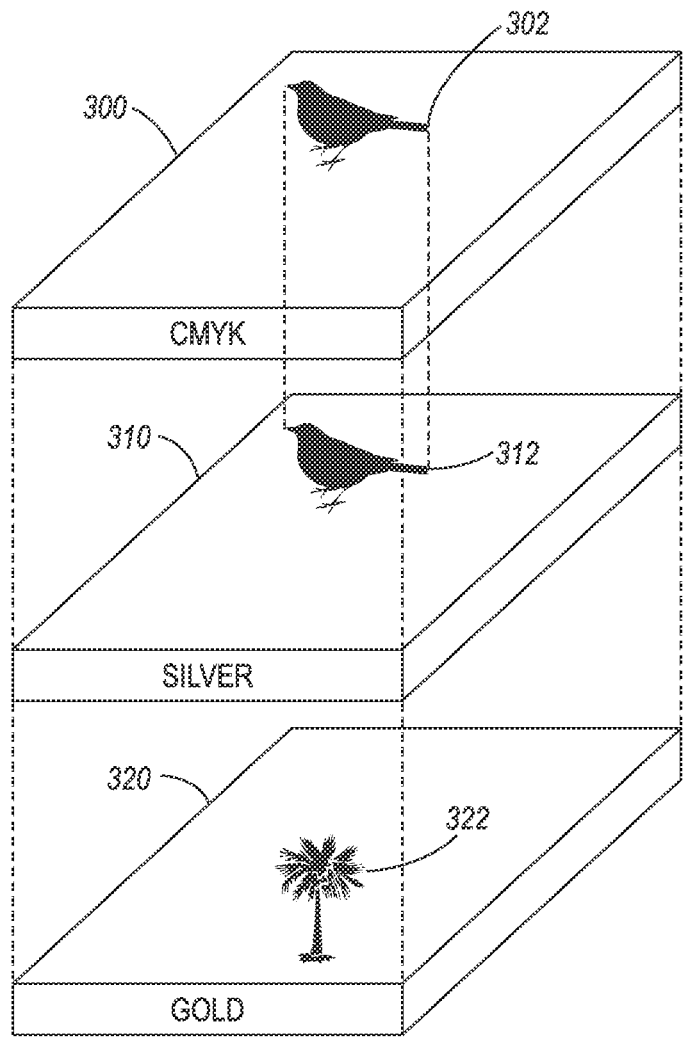
FIG. 8 is a schematic diagram illustrating different color planes used by methods and devices herein.

FIG. 8 is a schematic diagram conceptually illustrating different color planes, where two color planes are spot colorants (extension marking materials). More specifically, color plane 300 is the CMYK base color plane; color plane 310 contains markings for one of the extension colorants (e.g., silver); and color plane 320 contains markings for another one of the extension colorants (e.g., gold).

As shown in FIG. 8 illustrates an image of a bird 302 being produced using the colorants within the CMYK color plane 300. This bird (also shown by identification numeral 312) is also produced using the extension color silver, as shown in the silver color plane 310, and the different portions of the bird 302 and 312 must be exactly aligned (as shown by the dashed lines) in order to provide high quality printing. To the contrary, the second extension colorant plane 320 (gold) includes an image of a tree 322 that is not closely aligned with the images of the bird 302, 312.

It is desirable to maintain the alignment of the portions of the bird 302, 312 because misalignment of such items would be readily apparent in the final printed item. Therefore, systems and methods herein optimize the order in which the extension colorants are used so that the extension colorant silver is used at the same time the CMYK colorants are used. Therefore, color planes 300 and 310 will be printed in the same printing pass.

To the contrary, because the image of the tree 322 does not need to be closely aligned with the images of the bird (302, 312) the order optimization process herein prints the gold color plane 320 in the second printing pass. Thus, if there is some slight misalignment in the second printing pass, it will not be as readily apparent in the final printed product because of the relatively larger spacing of the tree 322 to the bird 302, 312 (relative to the zero spacing alignment required between images 302 and 312).

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

A raster image tangible processor (RIP) is a component used in a printing system that produces a raster image also known as a bitmap. The bitmap is then sent to a printing device for output. Raster image processing is the process that turns vector digital information into a high-resolution raster image.

Thus, an image input device is any device capable of obtaining color pixel values from a color image. The set of image input devices is intended to encompass a wide variety of devices such as, for example, digital document devices, computer systems, memory and storage devices, networked platforms such as servers and client devices which can obtain pixel values from a source device, and image capture devices. The set of image capture devices includes scanners, cameras, photography equipment, facsimile machines, photo reproduction equipment, digital printing presses, xerographic devices, and the like. A scanner is one image capture device that optically scans images, print media, and the like, and converts the scanned image into a digitized format. Common scanning devices include variations of the flatbed scanner, generally known in the arts, wherein specialized image receptors move beneath a platen and scan the media placed on the platen. Modern digital scanners typically incorporate a charge-coupled device (CCD) or a contact image sensor (CIS) as the image sensing receptor(s). The scanning device produces a signal of the scanned image data. Such a digital signal contains information about pixels such as color value, intensity, and their location within the scanned image.

Further, an image output device is any device capable of rendering the image. The set of image output devices includes digital document reproduction equipment and other copier systems as are widely known in commerce, photographic production and reproduction equipment, monitors and other displays, computer workstations and servers, including a wide variety of color marking devices, and the like.

To render an image is to reduce the image data (or a signal thereof) to viewable form; store the image data to memory or a storage device for subsequent retrieval; or communicate the image data to another device. Such communication may take the form of transmitting a digital signal of the image data over a network.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A printing device comprising:
a processor;
a user interface operatively connected to said processor;
a printing engine operatively connected to said processor;
a sheet supply supplying print media to said printing engine;
permanent supply containers operatively connected to said processor, said permanent supply containers maintaining base marking materials used by said printing engine to print on said print media; and
a receptacle operatively connected to said processor,
said receptacle having a shape to connect to interchangeable supply containers maintaining extension marking materials used by said printing engine to print,
said extension marking materials being different colors from said base marking materials,
said processor receiving a print job using at least two of said extension marking materials,
said user interface outputting instructions to insert, into said receptacle, a first interchangeable supply container maintaining a first extension marking material of said extension marking materials,
said processor performing raster image processing to generate first markings and second markings,
said printing engine printing said first markings comprising a first portion of said print job on said print media to produce partially printed print media,
said first markings including markings made using said first extension marking material,
said user interface outputting instructions to return said partially printed print media to said sheet supply and to insert, into said receptacle, a second interchangeable supply container maintaining a second extension marking material of said extension marking materials,
said sheet supply supplying said partially printed print media to said printing engine,
said printing engine printing said second markings comprising a second portion of said print job on said partially printed print media to produce finally printed print media,
said second markings including markings made using said second extension marking material, and
said first extension marking material being a different color from said second extension marking material.

2. The printing device according to claim 1, said user interface outputting a listing of said extension marking materials that may be selected from for use with said print job.

3. The printing device according to claim 1, said processor determining whether said second interchangeable supply container is inserted into said receptacle before instructing said printing engine to print said second markings.

4. The printing device according to claim 1, said processor optimizing an order of use of said extension marking materials for said print job.

5. A printing device comprising:
a processor;
a user interface operatively connected to said processor;
a printing engine operatively connected to said processor;
a sheet supply supplying print media to said printing engine;
permanent supply containers operatively connected to said processor, said permanent supply containers maintaining base marking materials used by said printing engine to print on said print media; and
a receptacle operatively connected to said processor,
said receptacle having a shape to connect to interchangeable supply containers maintaining extension marking materials used by said printing engine to print,
said extension marking materials being different colors from said base marking materials,
said processor receiving a print job,
said processor identifying at least two of said extension marking materials to use to print said print job,
said processor identifying which of said extension marking materials to use to print first markings and which of said extension marking materials to use to print second markings,
said user interface outputting instructions to insert, into said receptacle, a first interchangeable supply container maintaining a first extension marking material of said extension marking materials,
said processor performing raster image processing to generate first markings and second markings,
said printing engine printing first markings comprising a first portion of said print job on said print media to produce partially printed print media,
said first markings including markings made using said first extension marking material,
said user interface outputting instructions to return said partially printed print media to said sheet supply and to insert, into said receptacle, a second interchangeable supply container maintaining a second extension marking material of said extension marking materials,
said sheet supply supplying said partially printed print media to said printing engine,
said printing engine printing second markings comprising a second portion of said print job on said partially printed print media to produce finally printed print media,
said second markings including markings made using said second extension marking material, and
said first extension marking material being a different color from said second extension marking material.

6. The printing device according to claim 5, said user interface outputting a listing of said extension marking materials that may be selected from for use with said print job.

7. The printing device according to claim 5, said processor determining whether said second interchangeable supply container is inserted into said receptacle before instructing said printing engine to print said second markings.

8. The printing device according to claim 5, said processor optimizing an order of use of said extension marking materials for said print job.

9. A method comprising:
receiving, into a processor of a printing device, a print job using extension marking materials;
outputting instructions, on a user interface of said printing device, to insert, into a receptacle of said printing device, a first interchangeable supply container maintaining a first extension marking material of said extension marking materials, said receptacle having a shape to connect to interchangeable supply containers maintaining said extension marking materials used by a printing engine of said printing device to print;
performing raster image processing to generate first markings and second markings using said processor;
printing said first markings comprising a first portion of said print job on print media supplied from a sheet supply of said printing device to produce partially printed print media using said printing engine, said printing device comprising permanent supply containers maintaining base marking materials used by said printing engine to print, said extension marking materials being different colors from said base marking materials, said first markings including markings made using said first extension marking material;
outputting, on said user interface, instructions to return said partially printed print media to said sheet supply and to insert, into said receptacle, a second interchangeable supply container maintaining a second extension marking material of said extension marking materials;
supplying said partially printed print media from said sheet supply to said printing engine; and
printing said second markings comprising a second portion of said print job on said partially printed print media using said printing engine to produce finally printed print media,
said second markings including markings made using said second extension marking material, and
said first extension marking material being a different color from said second extension marking material.

10. The method according to claim 9, further comprising outputting, on said user interface, a listing of extension marking materials that may be selected from for use with said print job.

11. The method according to claim 9, further comprising determining whether said second interchangeable supply container is inserted into said receptacle before instructing said printing engine to print said second markings, using said processor.

12. The method according to claim 9, further comprising optimizing an order of use of said extension marking materials for said print job using said processor.

13. A method comprising:
receiving, into a processor of a printing device, a print job;
automatically identifying extension marking materials to use to print said print job, using said processor;
automatically performing raster image processing to generate first markings and second markings using said processor;
automatically identifying which of said extension marking materials to use to print said first markings and which of said extension marking materials to use to print said second markings, using said processor;
automatically outputting instructions, on a user interface of said printing device, to insert, into a receptacle of said printing device, a first interchangeable supply container maintaining a first extension marking material of said extension marking materials, said receptacle having a shape to connect to interchangeable supply containers maintaining said extension marking materials used by a printing engine of said printing device to print;

automatically printing said first markings comprising a first portion of said print job on print media supplied from a sheet supply of said printing device to produce partially printed print media using said printing engine, said printing device comprising permanent supply containers maintaining base marking materials used by said printing engine to print, said extension marking materials being different colors from said base marking materials, said first markings including markings made using said first extension marking material;

automatically outputting, on said user interface, instructions to return said partially printed print media to said sheet supply and to insert, into said receptacle, a second interchangeable supply container maintaining a second extension marking material of said extension marking materials;

automatically supplying said partially printed print media from said sheet supply to said printing engine; and automatically printing second markings comprising a second portion of said print job on said partially printed print media using said printing engine to produce finally printed print media, said second markings including markings made using said second extension marking material, said first extension marking material being a different color from said second extension marking material.

14. The method according to claim 13, further comprising outputting, on said user interface, a listing of extension marking materials that may be selected from for use with said print job.

15. The method according to claim 13, further comprising automatically determining whether said second interchangeable supply container is inserted into said receptacle before instructing said printing engine to print said second markings, using said processor.

16. The method according to claim 13, further comprising automatically optimizing an order of use of said extension marking materials for said print job using said processor.

* * * * *